United States Patent [19]
Kielbowicz

[11] Patent Number: 5,406,603
[45] Date of Patent: Apr. 11, 1995

[54] APPARATUS FOR REMOVING AEROSOLS FROM THE AIR OF A NUCLEAR REACTOR CONTAINMENT

[75] Inventor: Stanislaw Kielbowicz, Wädenswil, Switzerland

[73] Assignee: Sulzer Thermtec AG, Winterhur, Switzerland

[21] Appl. No.: 19,929

[22] Filed: Feb. 19, 1993

[30] Foreign Application Priority Data

Mar. 5, 1992 [EP] European Pat. Off. ............ 92810170

[51] Int. Cl.⁶ .................................................. G21C 19/42
[52] U.S. Cl. .................................... 376/313; 376/310; 376/314
[58] Field of Search ................ 376/283, 310, 314, 309, 376/293, 316; 209/139.2, 150; 976/DIG. 378, DIG. 382

[56] References Cited

U.S. PATENT DOCUMENTS

| | | | |
|---|---|---|---|
| 3,651,941 | 3/1972 | Imris | 209/139 R |
| 3,670,479 | 6/1972 | Tomlinson | 55/416 |
| 4,167,444 | 9/1979 | Schweiger | 376/310 |
| 4,741,879 | 3/1988 | McLean et al. | 376/301 |
| 4,936,878 | 6/1990 | Gustavsson | 55/92 |
| 5,032,222 | 7/1991 | Millioud | 159/4.1 |
| 5,122,333 | 6/1992 | Larsen et al. | 376/309 |

FOREIGN PATENT DOCUMENTS

| | | |
|---|---|---|
| 0403424 | 12/1990 | European Pat. Off. . |
| 2256766 | 11/1972 | Germany . |
| 2321567 | 7/1974 | Germany . |
| 88/09039 | 11/1988 | WIPO . |
| 89/08491 | 9/1989 | WIPO . |

*Primary Examiner*—Donald P. Walsh
*Assistant Examiner*—Meena Chelliah
*Attorney, Agent, or Firm*—Townsend and Townsend Khourie and Crew

[57] ABSTRACT

The apparatus is provided with a line (1) connected to the containment for feeding air to a water bath (5). The line (1) is connected to plurality of nozzles (4) disposed in the water bath (5) having at least one perforate baffle plate (27) disposed above said nozzles. A set (6) of static mixing elements (30, 31, 32) surrounded by a jacket (7) is disposed above said baffle plate (27). A dry separating stage is disposed above the water bath (5) and the set (6) and consists of an entry separator (8) and an agglomerator (9) which are in the form of annular discs. Air emerging from the set successfully flows through the entry separator (8) and the agglomerator (9) in opposite directions. The entry separator (8) and the agglomerator (9) consist of static mixing elements.

12 Claims, 2 Drawing Sheets

APPARATUS FOR REMOVING AEROSOLS FROM THE AIR OF A NUCLEAR REACTOR CONTAINMENT

BACKGROUND OF THE INVENTION

This invention relates to apparatus for removing aerosols contained in the air escaping from a containment of a nuclear reactor plant in the event of an excess pressure in such containment, the air being fed to a water bath, via a line connected to the containment, a plurality of nozzles disposed in the water bath being connected to said line and having at east one perforate baffle plate disposed above them, a set of static mixing elements surrounded by a jacket being disposed above said baffle plate and in the water bath.

In a known apparatus of this type (published European patent application No. 403 424) the air leaving the water bath flows directly via a line into an outgoing air chimney without any further filtration stages. It has been found that a degree of separation (or decontamination factor) of approximately 1000 is achieved with the known apparatus. This Factor represents the ratio of the total aerosol particle concentration at the entry to the apparatus to that at the apparatus outlet. In order to avoid environmental pollution as far as possible, however, it is desirable to increase the degree of separation of the known apparatus, and this is the object of this invention.

SUMMARY OF THE INVENTION

To solve this problem, according to the invention, a dry separating stage is disposed above the water bath and the set and consists of an entry separator and an agglomerator, and the entry separator and the agglomerator have the air emerging from the set flowing through them successively and in opposite directions.

Thus this solution provides a dry separating part after the prior-art wet separating part in the known apparatus, inside the same tank as contains the wet separating part. By the provision of the dry separating part the degree of separation is increased to at least 10,000, since in this part it is possible to retain even very small aerosol particles of the order of magnitude of one micrometer.

BRIEF DESCRIPTION OF THE DRAWING

FIG. 3 is a plan view of the nozzle system;

FIG. 4 is a detail of the nozzle system; and

FIG. 5 is a longitudinal section through a nozzle with three baffle plates.

DESCRIPTION OF THE PREFERRED EMBODIMENTS

Figure 1:
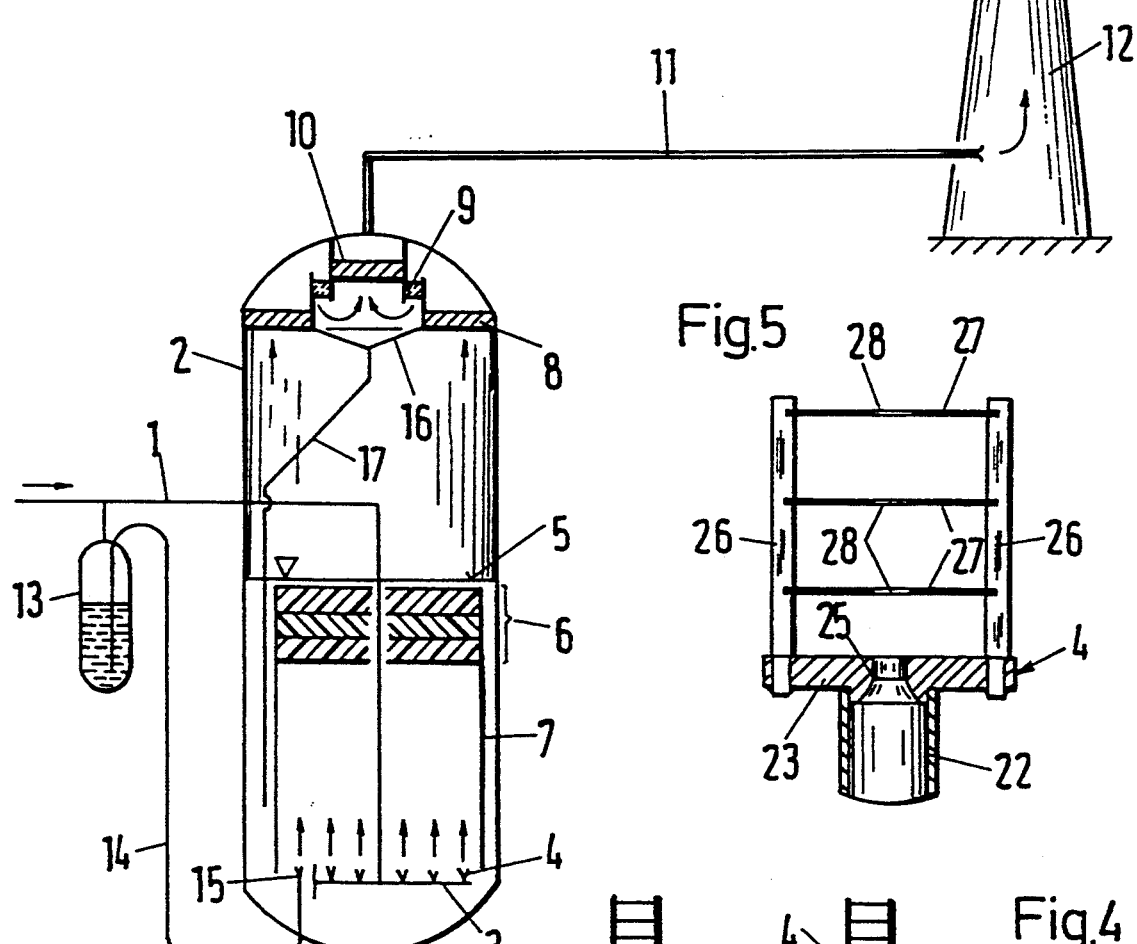
FIG. 1 is a simplified diagram showing the apparatus according to the invention.

Referring to FIG. 1, reference 1 denotes a line whose end not shown in FIG. 1 is connected to the interior of a containment or safety vessel of a nuclear reactor plant. That part of the line 1 which is not shown contains containment isolating valves which open in the event of an inadmissible excess pressure in the containment. Line 1 passes through a tank 2 forming part of the apparatus For removing aerosols from the air supplied by way of line 1. Inside the cylindrical tank 2, the line 1 is taken down in its center and leads into a distributing system 3 on which nozzles 4 are disposed in the manner to be described in detail hereinafter.

The bottom part of the tank 2 contains a water bath 5, the level of which is substantially at half the height of the tank 2. A set 6 of static mixer elements is disposed in the bottom half of the tank 2 and is surrounded by a jacket 7 which extends down close to the zone of the nozzles 4. In the area of the upper end of the vessel 2 an entry separator 8 is provided in the form of an annular disc through which the air leaving the water bath 5 flows substantially upwards from below. In the direction of the center of the tank 2 the entry separator 8 is followed by an agglomerator 9 in the form of an annular disc through which the air leaving the entry separator 8 flows in the opposite direction. Following the agglomerator 9 is an exit separator 10 which is situated at the center of the tank 2 and through which the air flows in the same direction as the entry separator. A line 11 is connected to the highest point of the tank 2 and discharges to atmosphere via a chimney 12 the air from which the aerosols have been removed. Beneath the agglomerator 9 is a condensate collecting tank 16 with a discharge line 17.

Connected to the line 1 is a reservoir 13 containing liquid sodium thiosulphate. The end of a line 14 is immersed in this liquid, said line 14 leaving the top of the reservoir 13, passing through the tank 2 and leading into a nozzle 15 disposed at the level of the nozzle 4 but separate therefrom.

As will be seen from FIGS. 3 and 3, the distributing system 3 comprises a distributing head 20 in the form of a collector which is connected to the bottom end of the line 1 and which is closed at its bottom end and is supported by that end on the bottom of the tank 2. From the head 20 distributing arms 21 and 21' radiate radially outwards, arms 21 extending horizontally and arms 21' extending upwards at a slight angle. As a result, the connecting points of the arms 21 and can be so disposed on the head 20 that there is no inadmissible weakening of the wall of the head Nozzles 4 are distributed over the length of the arms 21 and, as shown in FIGS. 4 and 5, consist of a vertical tube portion 22 and a plate 23 welded thereon and having an upwardly tapering nozzle aperture The tube portions 22 are welded to the arm 21 by the bottom end. Three upwardly extending vertical rods are welded on the plate 23 (only two rods shown in FIG. 5), and between them there are secured three baffle plates 27. The latter each have a central hole 28 in line with the nozzle aperture 25, the hole in the bottom plate 27 having the smallest diameter; the hole diameter increases in the baffle plates situated thereabove. Nozzles of the type described are also provided in the tank 2 between the distributing arms and 21', distributing Fingers 29 (FIG. 4) which extend transversely of arms 21 being connected to the latter and each having a nozzle 4 at its end. Nozzles 4 with vertical tube portions 22 are also disposed on the distributing arms 21' in the same way as described in connection with the distributing arms 21.

Figure 2:
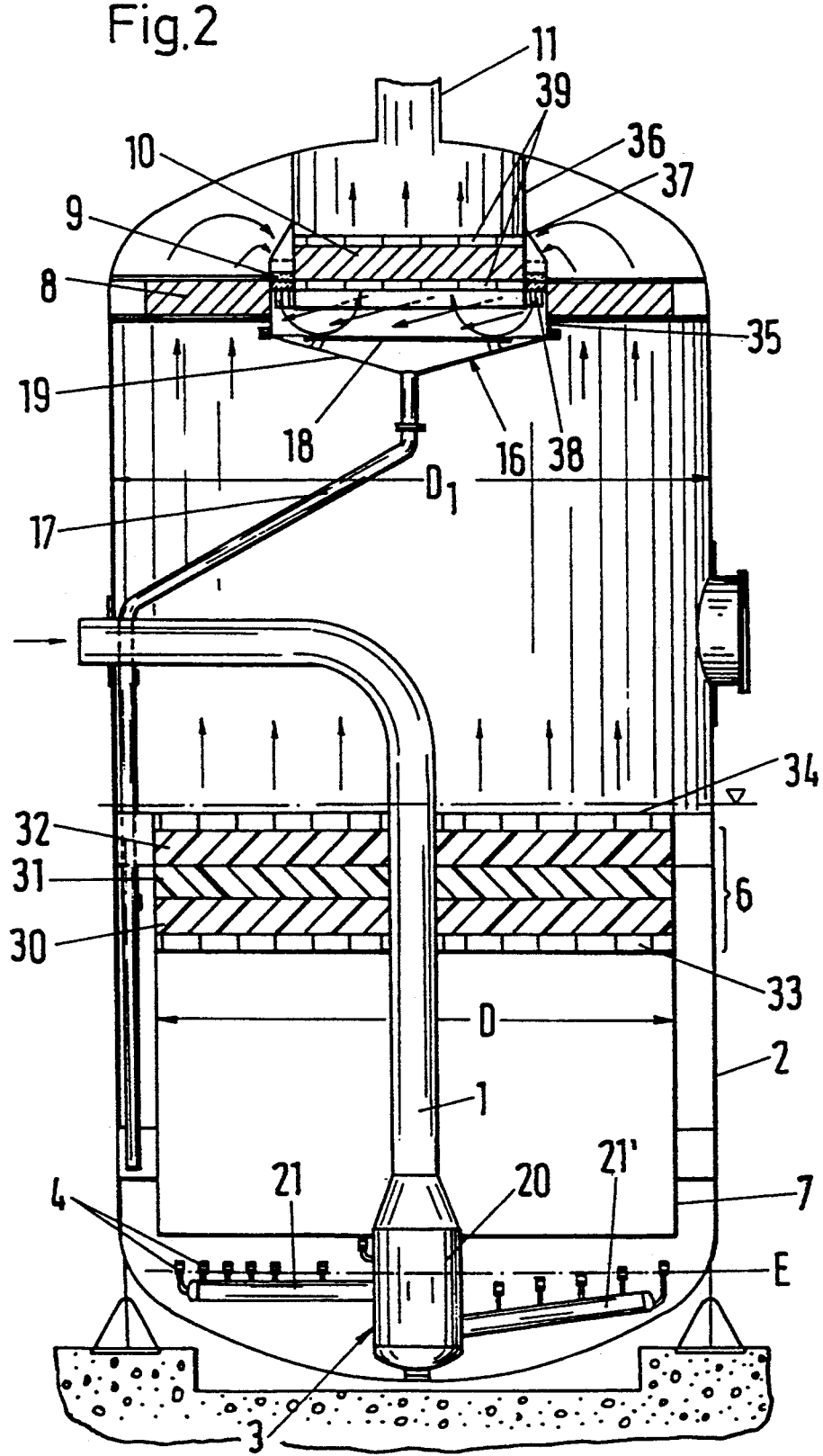
FIG. 2 is a vertical section through the apparatus.

Referring to FIG. 2, the set 6 of static mixing elements consists of three layers 30, 31 and 32. The mixing elements of all three layers consist in known manner of corrugated or fluted flat material, sheet metal. They are so constructed that defined open crossing flow ducts form between them. The detailed construction of such mixing elements is described, for example, in CH-PS 547 120. In the set 6, the mixing elements of the bottom layer 30 and of the top layer are of somewhat coarser dimensions in their construction than the mixing elements of the middle layer 31, i.e., the cross-sections of the flow ducts in the layers 30 and 32 are somewhat larger in dimensions than in the middle layer 31. The set 6 is held between a bottom perforate plate 33 and a top perforate plate 34 in the jacket 7. The height of the space between the nozzles 4—the plane in which the nozzles 4 are situated on average is defined by the dot-dash line E in FIG. 2—and the entry to the set 6 is a minimum of 0.25 D, where D is the inside diameter of the jacket The height of this space should not be more than equal to D.

The entry separator 8 in the top zone of the tank 2 is constructed from a layer of static mixing elements, like the layer 30 or 31 of set 6. The inside diameter of the entry separator 8 is limited by a tube portion 35 which forms part of the collecting trough 16. At the bottom the trough 16 is bounded by a shallow funnel 19, to the lowest point of which the condensate line 17 is connected. Inside the collecting trough 16, at the level of the top end of the funnel 19, there is provided a horizontal plate 18 which is supported on the funnel 19 by way of a number of feet and which has a vertical distance between its outer edge and the funnel. A tube portion 36 projects coaxially to the tube portion 35 into the collecting trough 16 from above and its top end is sealingly fixed to the roof of the tank 2. An annular gap is thus formed between the two portions 35 and 36 to accommodate the agglomerator 9. The latter consists of two layers of static mixing elements, which, however, are not constructed from flat material but from wire netting. Radial-axial sheet-metal webs 37 are fixed above the agglomerator between the tube portions 35 and 36 and act as guide surfaces for the air entering the agglomerator 9. Deflectors 38 in the form of blades are secured to the tube portions 36 beneath the agglomerator 9 as considered in the direction of flow and extend at an angle to the vertical and thus impart to the air emerging from the agglomerator 9 a swirl about the vertical axis of the collecting trough 16. The exit separator 10 is disposed inside the tube portion 36 and, like the entry separator 8, is constructed from static mixing elements of the sheet-metal type. As in the case of the set the static mixing elements of the exit separator 10 are held between two perforate plates 39. As will be seen from FIG. 2, the flow cross-sections of the entry separator 8 and of the exit separator 10, on the one hand, and of the agglomerator 9, on the other hand, are very different, the latter being much smaller than the cross-section of the separators 8 and 10. The distance between the exit of the set 6 and the entry to the entry separator 8 is a minimum of 0.8 $D_1$ where $D_1$ is the inside diameter of the tank 2.

The apparatus described operates as follows. In the event of an inadmissible excess pressure occurring in the containment, e.g. due to melt-down of the reactor core, the above-mentioned containment isolating valves in line 1 open. Air charged with aerosols, such as water vapor, carbon dioxide, hydrogen, iodine, etc., then flows from the containment via line 1 to the distributing head 20, from which it flows into the nozzles 4 via the distributing arm 21 and 21' and, where applicable, the distributing fingers 29. The air emerging from the nozzle apertures 25 entrains water from the surroundings and is mixed intensively as it flows through the holes 28 into the following baffle plates 27. The resulting water and air mixture flows on upwardly and enters the static mixing elements of set 6 via the perforate plate 33. A continuous splitting up, expansion and re-arrangement of the components of the water and air mixture takes place in the crossing flow ducts of the mixing elements, the air which entrains the aerosols being dispersed in the water. The aerosols are separated from the air onto the water or onto the mixing elements. At the top end of the set 6 the air from which the majority of aerosols has been removed leaves the wet part of the apparatus and then flows on up to the dry part in the top part of the tank 2. The aerosols still contained in this upwardly flowing air are in the form of very fine water droplets containing the substances which are to be retained. The diameter of the droplets is in the micrometer range. To enable these droplets also to be removed from the air, the air then passes through the entry separator 8 substantially in the upward direction from below. After the air emerges from the entry separator 8, it is deflected at the curved roof of the tank 2 into the opposite direction and then flows through the agglomerator 9. As the air emerges from the agglomerator 9 it is given a swirl by the deflectors 38, so that a rotating air flow forms in the collecting trough 16. As a result, the droplets are hurled against the tube portion 35 of the collecting trough 16 by centrifugal force. The droplets separated in these conditions flow as a condensate in the funnel 19 to the discharge line 17, via which they are then returned to the water bath 5. The air, from which the droplets have thus been removed, is then deflected upwardly and flows through the exit separator 10, in which aerosol droplets are again retained. The very pure air leaving the exit separator 10 then passes directly to the chimney 12 via the line 11. A degree of separation of about 100,000 is obtained by means the said distance between the nozzles 4 and the set and with the exit separator 10 in the dry part.

With the opening of the containment isolating valves and the entry of air into the distributing systems 3, air also flows to the reservoir 13, so that sodium thiosulphate passes from this tank via the line 14 to the nozzle 15. The sodium thiosulphate is injected into the water bath 5 in order to fix the iodine entrained in the air. The pH of the water is set to 10–11 by means of soda.

Contrary to the exemplified embodiment described, the level of the water bath 5 may be lower than illustrated so that the set 8 is only partially situated in the water or completely outside the same.

The entry separator 8 in the form of an annular disc may be composed of contiguous sets of static mixing elements, each such set forming a ring sector. A similar construction is also possible for the agglomerator 9 in the form of an annular disc.

What is claimed is:

1. Apparatus for removing aerosols contained in air escaping from a containment of a nuclear reactor plant in the event of an excess pressure in such containment, the air being fed to a water bath via a line connected to the containment, the apparatus comprising a plurality of nozzles disposed in the water bath being connected to said line and having at least one perforate baffle plate disposed above them, a set of static mixing elements surrounded by a jacket being disposed above said baffle plate and in the water bath, a dry separating stage disposed above the water bath and the set and comprising an entry separator and an agglomerator, the entry separator and the agglomerator having the air emerging from the set flowing through them successively and in opposite directions, the entry separator having static mixing elements made of one of sheet-metal and plastics, and the agglomerator having static mixing elements made from wire netting.

2. Apparatus according to claim 1, wherein the entry separator and the agglomerator include annular discs and the agglomerator is surrounded by the entry separator.

3. Apparatus according to claim 1, wherein the agglomerator is followed by an exit separator through which the air flows in the opposite direction to the direction of flow in the agglomerator.

4. Apparatus according to claim 3, wherein the exit separator includes static mixing elements made of sheet-metal or plastics.

5. Apparatus according to claim 3, including a collecting trough having a base in the form of a funnel disposed beneath the agglomerator and the exit separator, and a line which leads into the water bath being connected to its lowest point.

6. Apparatus according to claim 5, including a horizontal plate disposed in the collecting trough substantially at a height of a top end of the funnel-shaped base, the plate having an edge spaced from the funnel-shaped base so as to leave a passage.

7. Apparatus according to claim 1, including a plurality of baffle plates each having a central hole disposed one above the other for each nozzle.

8. Apparatus according to claim 7, wherein the central holes have diameters increasing from plate to plate in the direction of flow of the air.

9. Apparatus according to claim 2, including swirl-imparting deflectors provided after the annular-discoid agglomerator as viewed in the direction of flow and distributed over the periphery thereof.

10. Apparatus according to claim 1, wherein the vertical distance between the nozzles and the set is at least 0.025 times an inside diameter of the jacket.

11. Apparatus according to claim 1, including a sodium thiosulphate supply leading into the water bath.

12. Apparatus according to claim 11, wherein the thiosulphate supply comprises a reservoir having a portion situated above the supply connected to the line connected to the containment, and which has a connecting line, one end of which is immersed in the supply and the other end of which leads into the water bath at the level of the nozzles.

* * * * *